(12) United States Patent
Mitchem et al.

(10) Patent No.: US 11,811,682 B1
(45) Date of Patent: Nov. 7, 2023

(54) SYSTEMS AND METHODS TO UTILIZE EDGE COMPUTING TO RESPOND TO LATENCY IN CONNECTED VEHICLES

(71) Applicant: United Services Automobile Association (USAA), San Antonio, TX (US)

(72) Inventors: Sean Mitchem, San Antonio, TX (US); Ashley Philbrick, San Antonio, TX (US); Yevgeniy Khmelev, San Antonio, TX (US); Justin Jackson, San Antonio, TX (US); Ruthie Lyle, San Antonio, TX (US); Ravi Durairai, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/063,755

(22) Filed: Dec. 9, 2022

Related U.S. Application Data

(62) Division of application No. 17/062,696, filed on Oct. 5, 2020, now Pat. No. 11,539,641.

(60) Provisional application No. 62/910,054, filed on Oct. 3, 2019.

(51) Int. Cl.
| | | |
|---|---|---|
| G06F 15/173 | (2006.01) | |
| H04L 47/70 | (2022.01) | |
| H04W 4/40 | (2018.01) | |
| H04W 24/10 | (2009.01) | |
| H04L 67/12 | (2022.01) | |
| H04L 67/289 | (2022.01) | |
| H04W 64/00 | (2009.01) | |
| G08G 9/02 | (2006.01) | |

(52) U.S. Cl.
CPC ............ *H04L 47/824* (2013.01); *H04L 67/12* (2013.01); *H04L 67/289* (2013.01); *H04W 4/40* (2018.02); *H04W 24/10* (2013.01); *H04W 64/00* (2013.01); *G08G 9/02* (2013.01)

(58) Field of Classification Search
CPC ..... H04L 47/824; H04L 67/12; H04L 67/289; H04W 4/40; H04W 24/10; H04W 64/00; G08G 9/02
See application file for complete search history.

(56) References Cited

U.S. PATENT DOCUMENTS

| | | | |
|---|---|---|---|
| 9,609,654 B1 * | 3/2017 | Desclos | ................ H04B 1/005 |
| 10,121,148 B1 | 11/2018 | Kozlowski | |
| 10,621,673 B1 | 4/2020 | Christensen | |
| 11,061,408 B1 | 7/2021 | Hayward | |
| 11,145,000 B1 | 10/2021 | Baker | |

(Continued)

FOREIGN PATENT DOCUMENTS

| | | | | |
|---|---|---|---|---|
| CN | 1557084 A | * | 12/2004 | ............. H04L 1/188 |
| CN | 110647382 B | * | 2/2022 | ......... G06F 9/45558 |

(Continued)

*Primary Examiner* — Richard G Keehn
(74) *Attorney, Agent, or Firm* — BakerHostetler

(57) ABSTRACT

Systems and methods for responding to latency in connected vehicles. Vehicles operating on or near the edge of networks are identified. Vehicle dependent nodes are identified. Latency is calculated between the vehicle and the dependent nodes. The latency is compared to one or more threshold values and a response is determined and/or executed.

19 Claims, 3 Drawing Sheets

(56) References Cited

U.S. PATENT DOCUMENTS

| | | | |
|---|---|---|---|
| 2010/0106820 A1* | 4/2010 | Gulati | G06F 9/52 |
| | | | 709/224 |
| 2011/0021234 A1 | 1/2011 | Tibbitts | |
| 2015/0019266 A1 | 1/2015 | Stempora | |
| 2015/0025917 A1 | 1/2015 | Stempora | |
| 2015/0120336 A1 | 4/2015 | Grokop | |
| 2017/0058234 A1 | 3/2017 | Sohling | |
| 2017/0093976 A1* | 3/2017 | Raghunath | H04L 67/1008 |
| 2017/0171720 A1* | 6/2017 | Holleczek | H04W 4/42 |
| 2017/0324817 A1* | 11/2017 | Oliveira | H04L 67/52 |
| 2018/0122234 A1* | 5/2018 | Nascimento | G08G 1/0116 |
| 2018/0255508 A1* | 9/2018 | Lopes | H04W 4/40 |
| 2018/0343587 A1* | 11/2018 | Condeixa | H04W 4/027 |
| 2019/0020973 A1 | 1/2019 | Harish | |
| 2019/0230525 A1* | 7/2019 | Carreira | H04W 16/32 |
| 2019/0373521 A1* | 12/2019 | Crawford | H04L 67/52 |
| 2022/0005291 A1 | 1/2022 | Konrardy | |
| 2022/0092699 A1 | 3/2022 | Browne | |

FOREIGN PATENT DOCUMENTS

| | | | | |
|---|---|---|---|---|
| IN | 201841049417 A | * | 7/2019 | |
| KR | 20170058234 A | | 5/2017 | |
| WO | WO-2017079372 A1 | * | 5/2017 | H04L 43/12 |

* cited by examiner

SYSTEMS AND METHODS TO UTILIZE EDGE COMPUTING TO RESPOND TO LATENCY IN CONNECTED VEHICLES

CROSS-REFERENCE TO RELATED APPLICATIONS

This patent application is a Divisional Application and claims priority to and the benefit of pending Ser. No. 17/062,696, filed on Oct. 5, 2020, which pending application claims priority to and the benefit of provisional patent application 62/910,054 filed Oct. 3, 2019, both of which are incorporated herein by reference to their entirety.

BACKGROUND

The adoption and application of networking to vehicles has created many advantages. Automobiles and other vehicles can now communicate with each other and with fixed networking equipment. Such networking has had many advantages, including improved traffic management, vehicle diagnostics, and driver safety. As vehicles become more and more connected, however, it can be seen be predicted that vehicles may become more and more dependent on network communication. Furthermore, to the extent that a vehicle ability to communicate with various networks is degraded, it is possible that the risk associated with operation of the vehicle may rise. Similarly, as a vehicle's ability to communicate with networks improves, risk may decrease. Accordingly, what is needed are systems and methods to utilize edge computing to respond to network latency in connected vehicles. In addition, it would be advantageous to predict and mitigate risk associated with network latency in connected vehicles.

SUMMARY

In an embodiment, a method comprises identifying at least one vehicle operating on a boundary of the network; determining at least one node on the network that is providing a service to the at least one vehicle; calculating latency between the at least one vehicle and the at least one node; determining that latency, between the at least one vehicle and the at least one node through deployment of resources on the boundary of the network, exceeds a predetermined threshold; and moving a service associated with the vehicle to at least one closer node having a latency with the at least one vehicle below the predetermined threshold.

In another embodiment a non-transitory computer-readable medium comprises instructions that when executed by a processor are configured to: identify at least one vehicle operating on a boundary of a network; determine at least one node on the network that is providing a service to the at least one vehicle; calculate latency between the at least one vehicle and the at least one node; determine that latency, between the at least one vehicle and the at least one node through deployment of resources on the boundary of the network, exceeds a predetermined threshold; and move a service associated with the vehicle to at least one closer node having a latency with the at least one vehicle below the predetermined threshold.

Systems are also disclosed that can be configured to reduce latency in communications with a vehicle.

The foregoing Summary is provided only to describe a limited subset of aspects described herein and should not be interpreted to limit the entirety of the disclosure in any way.

BRIEF DESCRIPTION OF THE DRAWINGS

The following drawings show generally, by way of example, but not by way of limitation, various examples discussed in the present disclosure. In the drawings.

DETAILED DESCRIPTION

It is to be appreciated the subject disclosure is described below more fully with reference to the accompanying drawings, in which illustrated embodiments are shown. The disclosure is not limited in any way to the illustrated embodiments as the illustrated embodiments described below are merely exemplary, which can be embodied in various forms, as appreciated by one skilled in the art. Therefore, it is to be understood that any structural and functional details disclosed herein are not to be interpreted as limiting, but merely as an illustration of one or more embodiments which the present disclosure may form. Furthermore, the terms and phrases used herein are not intended to be limiting but rather to provide an understandable description of the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof as known to those skilled in the art, and so forth.

It is to be appreciated that certain embodiments of this disclosure as discussed below are a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the disclosure based on the above-described embodiments. Accordingly, the disclosure is not to be limited by what has been particularly shown and described. Further, although at least one series of steps are presented as an exemplary method of practicing one or more embodiments described herein, it will be appreciated by those skilled in the art that the steps identified may be practiced in any order that is practicable, including without limitation the omission of one or more steps.

Figure 1:
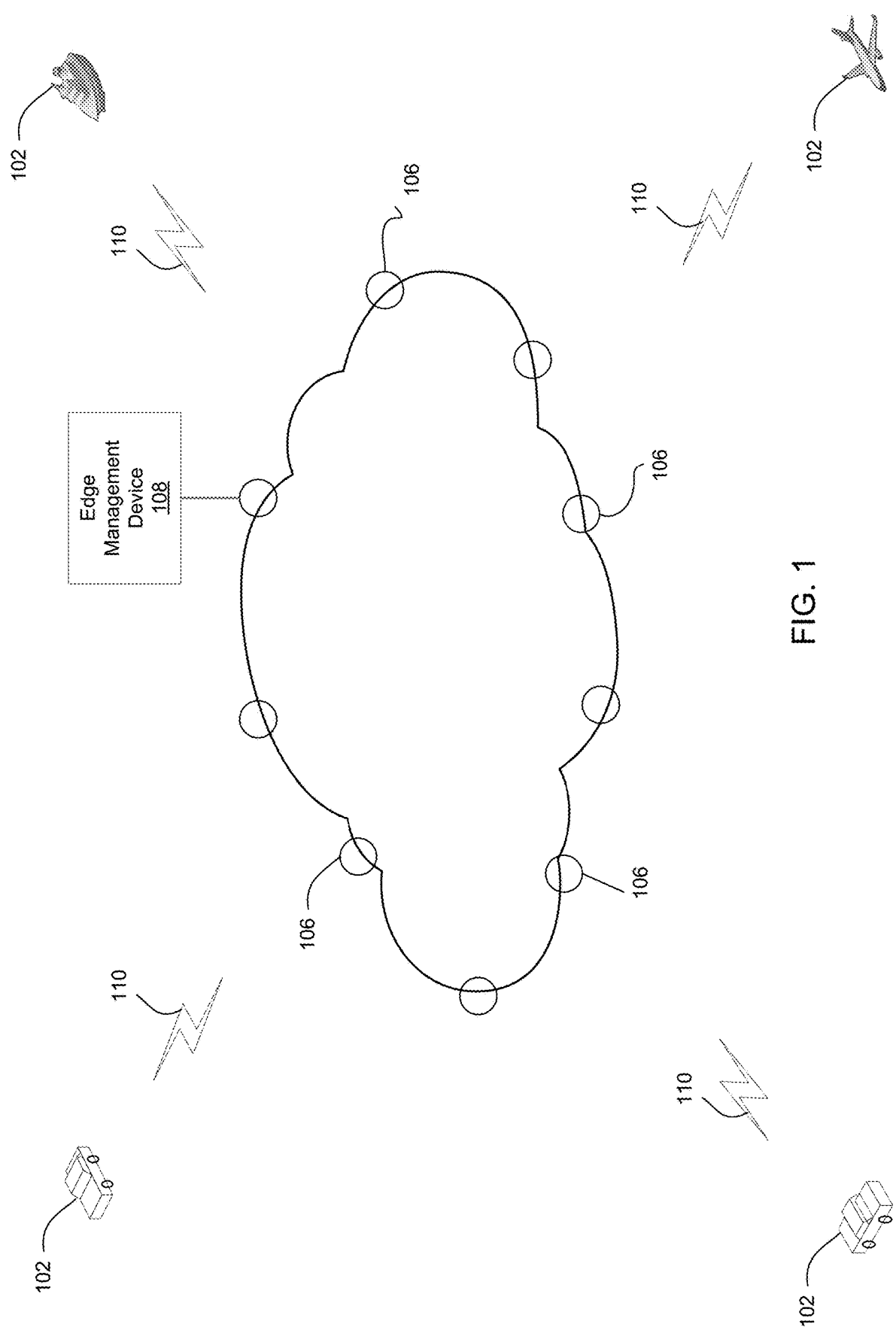
FIG. 1 depicts an exemplary system utilizing edge computing to minimize latency between networks and connected vehicles.

Referring to FIG. 1, a system 100 is shown in which one or more vehicles 102 are communicating with at least one network 104. As is shown in FIG. 1, vehicles 102 may be various combinations of vehicle types, such as automobile or land vehicles, aircraft, or water vehicles. Vehicles 102 may include one or more computing devices integral and/or interoperable with vehicles 102 that are in communication with network 104.

Network 104 in one example comprises, in addition to vehicles 102, a number of nodes 106. A node 106 in one example may be a vehicle 102. A node 106 in one example may be a fixed or mobile communication device or a computing device. In one example, a node 106 may comprise an edge management device (EMD) 108. An EMD in one example comprises a computing device executing the functionality described herein. For example, one or more EMDs 108 may be used to identify and monitor vehicles 102 operating at the edge of network 104, calculate latency, and respond with one or more countermeasures or other responses. EMDs 108 in one example may notify other systems, such as other nodes 106 of network 104 or devices operating on other networks, as to the result of its processes and/or decisions. For instance, EMD 108 may notify a server of an insurance company that a vehicle 102 is operating outside of a certain threshold of latency with respect to network 104, such that he insurer could change the premium of an insurance policy covering the vehicle 102 and/or the vehicle operator 104. An exemplary device, which may comprise one or more nodes 106 is described in connection with FIG. 3 for illustrative purposes. It should also be recognized that network 104 may be a single network or a plurality of networks. Furthermore, the various function and processes described herein could be combined, divided, or distributed over one or more networks 104 as part of a distributed processing environment.

Referring further to FIG. 1, it is to be appreciated that network 104 depicted in FIG. 1 may comprise one or more local area networks (LANs), wide area networks (WANs), personal area network (PANs), and/or combinations thereof. Such networking environments are commonplace in offices, enterprise-wide computer networks, intranets, and the Internet. For instance, LAN networking environment may involve connecting portions of the system 100 to the LAN through a network interface or adapter (not shown). When a WAN networking environment, may include connecting devices through modems, routers, network interfaces, or other means for establishing communications over the WAN, such as the Internet. Such connection devices may be internal or external, may be connected to a system bus via a user input interface, or via another appropriate mechanism. In a networked environment, program modules depicted relative to the network 104, or portions thereof, may be stored in a remote memory storage device such as storage medium. Communication links 110 may comprise either wired or wireless links. It is to be appreciated that the illustrated network components of FIG. 1 are exemplary.

Referring further to FIG. 1, nodes 106 may be defined, in certain contexts, as edge computing devices. Edge computing devices operate on the boundaries of network 104. In one example, a node 106 may be a micro data center ("MDC"). A MDC may be a stationary MDC or a mobile MDC. A MDC may be used to provide resources on the edge of network 104 on an as needed basis. For example, EMD 108 may identify one or more processes. The processes may be requests, such as data storage or data processing requests, that a node 106 may seek fulfillment from one or more resources of network 104. EMD 108 may determine that such a process is a candidate for fulfillment on the edge of network 104. EMD 108 may then evaluate whether or not it is feasible to fulfill such a request on the edge of the network 104.

Feasibility of fulfillment may be determined by on or more factors. For example, are there sufficient edge resources to fulfill the request. If there are certain resources, do the resources meet other criteria that may be necessary to fulfill the request. For example, do the edge resources have sufficient security in place or do the edge resources meet sufficient latency requirements. If the edge resources do not meet such criteria, then the request may be fulfilled in a usual manner within the network. If the edge resources do meet the criteria, then the edge resources may fulfill the request.

In another example, it may be the case that sufficient resources do not exist at the edge of the network, but that it is feasible to deploy one or more resources, such as one or more MDCs to fulfill the request. EMD 108 may determine that it would be worthwhile to deploy resources, such as MDCs, based on one or more criteria. For example, it may be less expensive to use MDCs to fulfill certain types of requests. In another example, EMD 108 may anticipate increasing demand for certain types of requests and therefore determined that it will likely be more efficient in the future to use MDCs. Accordingly, one or more MDCs may be deployed.

It should be noted that the rise of mobile computing devices, such as IoT devices and connected cars make it likely that the demand for resources on the edge of network (s) 104 will be constantly changing. For instance, IoT devices and vehicles 102 due to their mobile natures, may operate on the edge of network 104. The use of IoT devices and vehicles 102 on the edge of network 104 can put stress on the nodes 106 of network 104 that provide support for vehicles 102 and/or IoT devices within their context of being "connected"and mobile. In other words, the more connected vehicles 102 and/or IoT devices become with other nodes 106 of network 104, the more dependent these nodes 106 will become with respect to providing services and data to these vehicles 102 and IoT devices. If communications become inefficient between a vehicle 102 (or IoT device) and one or more nodes 106 of network 104, then there will be a corresponding degradation of the performance of the vehicle 102 (or IoT device). Such a degradation of performance may result in risk associated with operating vehicle 102 (or IoT device) increasing.

For example, a collision avoidance system of a vehicle 102 could depend on receiving accurate traffic data from one or more other nodes 106 of network 104. If a vehicle 102 began to receive data at a reduced or even non-existent rate, then the ability of vehicle 102 to avoid an accident may be degraded. Similarly, a vehicle monitoring system of a vehicle 102 may send vehicle data to one or more nodes 106 on network 104, which may use the vehicle data for predictive analytics to determine whether or not a vehicle 102 is in danger of an imminent breakdown. The vehicle operator could then be warned of the breakdown and take corrective measures. However, if latency between the vehicle 102 and network 104 results in an unwarned and unexpected breakdown, then the safety of the driver and/or vehicle could be adversely affected. An example would be an engine or tire failure during vehicle movement. Accordingly, vehicles 102 operating as edge devices may increase the risk profile of those vehicles 102 if and when communication latency between the vehicles 102 and network nodes 106 increases.

In another example, a connected vehicle may receive a data stream identifying hazards. For instance, a hazard may be identified as a make, model, color, license plate, and position (velocity, location, direction) data of stalled, potentially hazardous, or speeding vehicles. A collision avoidance may receive such data to avoid, help a driver avoid, or notify a driver of the hazard. In one example, a networked traffic light, or another device (in the case of a highway without traffic lights), may identify such hazards or may receive data identifying such hazards and relay the data to a connected vehicle. Such information may be weighted by importance and provided to vehicles in accordance with the weighting. An entity, such as a city or municipality, may broadcast this information as part of a subscription service. Regardless of the manner by which the data is sent, the latency at which the data is received by the vehicle is an important measure as to whether or not the systems reliant on the data will be effective. Increased latency would make these systems less reliable and increase risk associated with the operation of the vehicle.

One way to address such risk is to utilize edge computing to reduce latency. For instance, if services and data storage upon which vehicles 102 depend where to move closer to the edges upon which vehicles 102 were operating, then the risk could be reduced. Furthermore, if changes in latency between vehicles 102 and/or nodes 106 were identified in real time (or close to real time) or predicted in advance, then corresponding responses could be implemented. Examples of responses include, but are not limited to, moving certain services, such as data processing and data storage closer to the affected vehicles 102, sending warning to the affected vehicle operators, changing certain functions on the vehicles (e.g. collision avoidance) from automated to manual, changing functions from cloud based to local, etc. In addition, other responses could be performed. For example, an insurance company may calculate that a certain amount of latency (e.g. cumulative or periodic) causes an increase in risk to the vehicle or operator, and/or adjust an insurance premium. Such a premium could be adjusted periodically (during a renewal period) or during the time period of the calculated latency.

Figure 2:
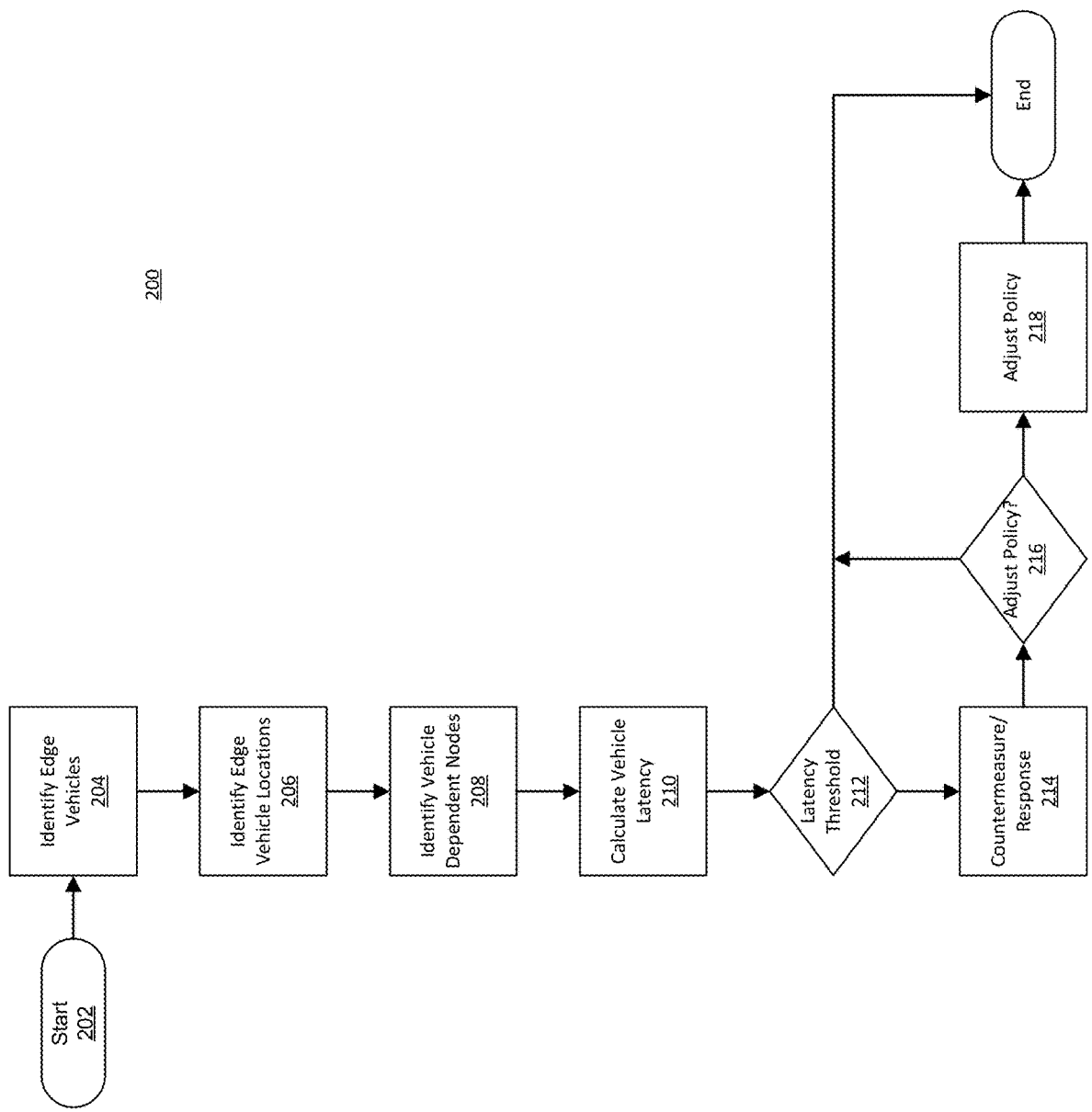
FIG. 2 is a flowchart depicting exemplary operation of the system of FIG. 1.

Referring to FIG. 2, an exemplary process 200 is now described for illustrative purposes. The process begins in step 202. In step 204, vehicles 102 operating at or near an edge of network 104 are identified. Such vehicles 102 may be identified through various mechanisms, such as GPS, triangulation of radio signals relative to base stations (WIFI, cellular, etc.) and/or participation in social platforms in which location is reported. Through identification of edge vehicles 102, process 200 may have a manageable sample size with which to work. Step 204 could be performed on a continual basis or during specific time intervals (peak traffic times). Step 204 could be performed as a batch process for all vehicles communicating on network 104 or iteratively as each vehicle nears an edge.

Referring further to FIG. 2, in step 206 process 200 identified the location of the edge vehicles 102. Such locations could be determined through the same mechanisms of the previous step 204, or through additional steps. For instance, if a more precise location were warranted than could be provided through one mechanism, then alternate mechanisms may be used. An example would be to use a vehicle telematics system to provide a location and then verify the location through a user's mobile device.

In step 208, vehicle dependent nodes 106 are identified. In one example, vehicle dependent nodes 106 are nodes 106 which a vehicle 102 depends upon in a material way. For instance, a node related to collision avoidance could have a material affect on the risk profile associated with a vehicle 102. Another example would be a node 106, which was providing vehicle monitoring with relation to important systems on the vehicle 102.

In step 210, vehicle latency is calculated with respect to the vehicle(s) 102 under consideration and the vehicle dependent nodes 106. Vehicle latency in one example may be calculated by measuring the signal strength between a vehicle 102 and one or more nodes 106. In another example, the length of time for signals to travel between a vehicle 102 and a node 106 could be measured through pinging the vehicle 102 from the nodes (or vice versa) and measuring the response time. In another example, the length of time needed to provide a service or provide a function from a node 106 to a vehicle could be calculated. Latency could be measured through one parameter or multiple parameters. Latency in one example could be a weighted calculation of multiple parameters.

In step 212, the vehicle latency is compared to a predetermined latency threshold. Latency may be measured with respect to individual nodes 106 or a plurality of nodes 106 operating together. In other words, the latency threshold 106 may relate to one or more nodes 106 or services. Accordingly, there may be multiple latency thresholds. In one example, if the latency measurement as compared to a threshold is acceptable then the process 200 ends. If the vehicle latency is not acceptable relative to a threshold, then in step 214 a response and/or countermeasure is implemented. A response countermeasure in one example comprises moving additional resources to the edge of network 104 to improve latency. For instance, additional server or memory capacity could be moved to the edge. Such additional capacity could take the form of hardware or virtual hardware. For instance, in a software defined network, virtual machines could be spun up to decrease latency. In another example, actual hardware infrastructure could be moved to the edge. In another example, mobile computing devices could be moved temporarily to the edge to address the latency issue. In one embodiment, a response may include sending a notification to the vehicles 102 that do not have acceptable latency levels. Such notifications could be used to warn operators of unsafe conditions or to cause vehicles to respond in some way. For instance, a vehicle 102 in response to a condition could switch to manual system or change to a local system that is not dependent on network 104.

Referring further to FIG. 2, in step 216, a determination may be made as to whether or not to adjust a policy related to a vehicle. One example would be an insurance policy of a vehicle 102 or operator based on the latency of vehicle 102 with respect to network 104 not being at an acceptable level. For instance, a correlation may be detected between latency and vehicle crashes and therefore the insurance premium may be adjusted. Conversely, improved latency may indicate less vehicle crashes, and a policy may be adjusted accordingly. In another example, a license related to the vehicle could be changed. For instance, an autonomous vehicle may lose its license to operate autonomously if certain latency thresholds are not met.

If it is determined in step 216 to adjust the policy, then in step 218, the policy is adjusted. Such a policy adjustment may take place periodically, as part of a renewal process, or in real (or close to) real time as part of a usage-based insurance model.

Figure 3:
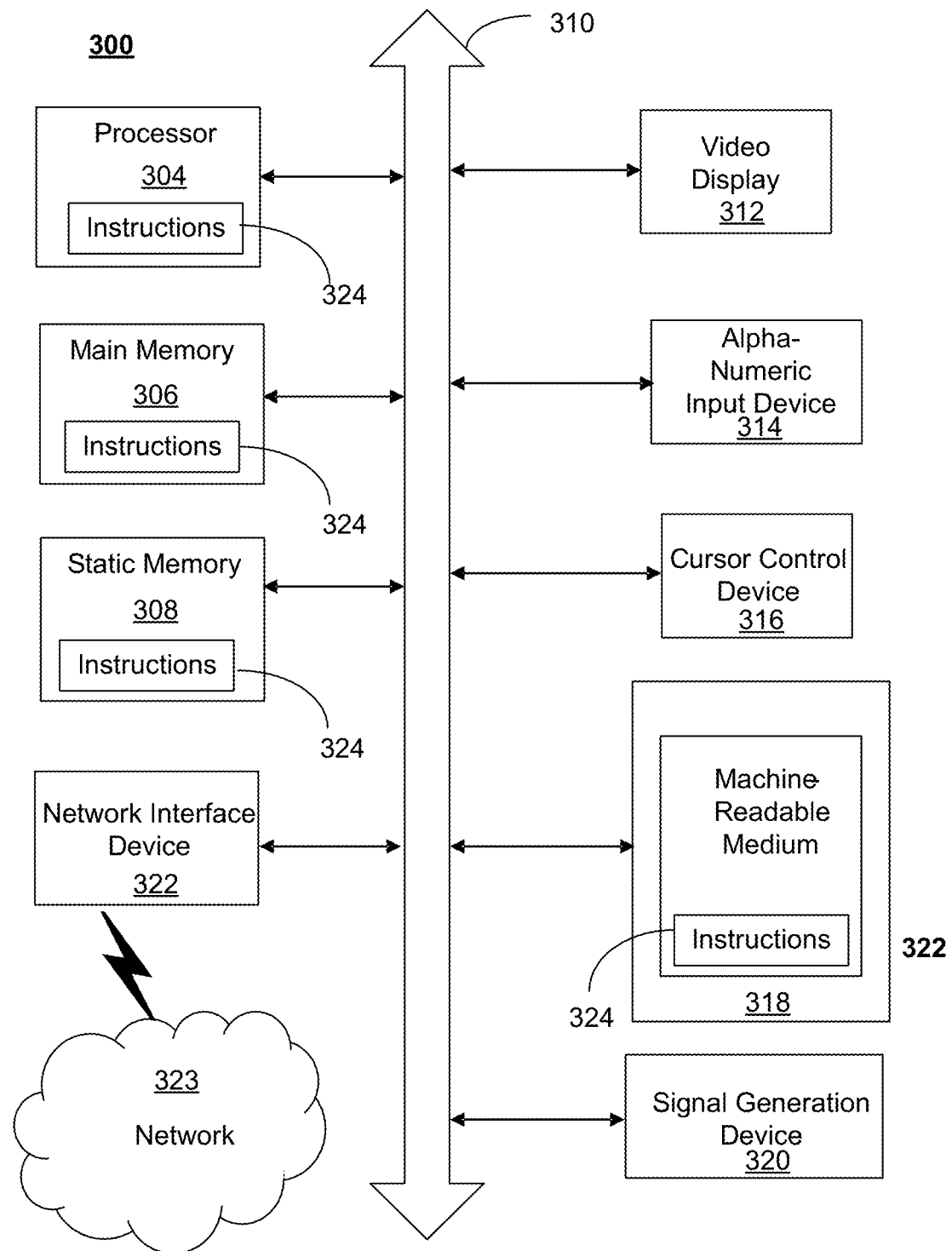
FIG. 3 depicts a computing device that may represent a node in the system of FIG. 1.

FIG. 3 depicts an exemplary diagrammatic representation of a machine in the form of a computer system 300 within which a set of instructions, when executed, may cause the machine to perform any one or more of the methods described above. One or more instances of the machine can operate, for example, to perform the functions of one or more nodes 106 shown in FIG. 1. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 300 may include a processor (or controller) 304 (e.g., a central processing unit (CPU)), a graphics processing unit (GPU, or both), a main memory 306 and a static memory 308, which communicate with each other via a bus 310. The computer system 300 may further include a display unit 312 (e.g., liquid crystal display (LCD), a flat panel, or a solid state display). Computer system 300 may include an input device 314 (e.g., a keyboard), a cursor control device 316 (e.g., a mouse), a disk drive unit 318, a signal generation device 320 (e.g., a speaker or remote control) and a network interface device 322. In distributed environments, the embodiments described in the subject disclosure can be adapted to utilize multiple display units 312 controlled by two or more computer systems 300. In this configuration, presentations described by the subject disclosure may in part be shown in a first of display units 312, while the remaining portion is presented in a second of display units 312.

The disk drive unit 318 may include a tangible computer-readable storage medium 324 on which is stored one or more sets of instructions (e.g., software 436) embodying any one or more of the methods or functions described herein, including those methods illustrated above. Instructions 336 may also reside, completely or at least partially, within main memory 306, static memory 308, or within processor 304 during execution thereof by the computer system 300. Main memory 306 and processor 304 also may constitute tangible computer-readable storage media.

While examples of a system 100 have been described in connection with various computing devices/processors, the underlying concepts may be applied to any computing device, processor, or system capable of facilitating a system 100. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for communications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a system 100 as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a system 100 has been described in connection with the various examples of the various figures, it is to be understood that other similar implementations may be used or modifications and additions may be made to the described examples without deviating therefrom. For example, one skilled in the art will recognize that a system 100 as described in the instant application may apply to any environment, whether wired or wireless, and may be applied to any number of such devices connected via a communications network and interacting across the network. Therefore, system 100 as described herein should not be limited to any single example, but rather should be construed in breadth and scope in accordance with any appended claims or claims, which claim priority to this application.

The invention claimed is:

1. A method comprising:

identifying at least one vehicle operating on a boundary of a network;

determining at least one node on the network that is providing a cloud-based service hosted in the network to the at least one vehicle;

measuring a first parameter related to how long it takes the at least one node to respond to a communication from the vehicle;

measuring a second parameter related to an amount of time that it takes for the at least one node to perform one or more tasks related to the service;

calculating a first weighted value for the first parameter and a second weighted value for the second parameter;

utilizing the first weighted value and the second weighted value to determine latency between the at least one vehicle and the at least one node;

determining that latency, between the at least one vehicle and the at least one node through deployment of resources on the boundary of the network, exceeds a predetermined threshold;

identifying a location of the vehicle; and moving a service associated with the vehicle to at least one alternate node closer to the location of the vehicle and having a latency with the at least one vehicle below the predetermined threshold by deploying at least one virtual machine providing the service to the at least one alternate node closer to the location of the vehicle and utilizing the at least one virtual machine to provide the service to the at least one vehicle.

2. The method of claim 1, wherein moving the service comprises:

positioning at least one hardware component in a vicinity of the location; and utilizing the at least one hardware component to provide the service to the at least one vehicle.

3. The method of claim 1, further comprising:

transmitting a notification to a third party if the latency exceeds a predetermined threshold.

4. The method of claim 1, wherein the service comprises storing data.

5. The method of claim 1, wherein the service comprises processing data.

6. The method of claim 1, wherein the service supports a collision avoidance system utilized by the at least one vehicle.

7. The method of claim 1, wherein the service is utilized to monitor at least one vehicle sensor.

8. The method of claim 1, wherein latency is based in part on signal strength between the node and the vehicle.

9. The method of claim 1, wherein the latency exceeding the predetermined threshold is associated with a safety risk.

10. A non-transitory computer-readable medium comprising instructions that when executed by a processor are configured to:

identify at least one vehicle operating on a boundary of a network;

determine at least one node on the network that is providing a cloud-based service hosted in the network to the at least one vehicle;

measure a first parameter related to how long it takes the at least one node to respond to a communication from the vehicle;

measure a second parameter related to an amount of time that it takes for the at least one node to perform one or more tasks related to the service;

calculate a first weighted value for the first parameter and a second weighted value for the second parameter;

utilize the first weighted value and the second weighted value to determine latency between the at least one vehicle and the at least one node;

determine that latency, between the at least one vehicle and the at least one node through deployment of resources on the boundary of the network, exceeds a predetermined threshold;

identify a location of the vehicle; and move a service associated with the vehicle to at least one node closer to the location of the vehicle and having a latency with the at least one vehicle below the predetermined threshold by deploying at least one virtual machine providing the service to the at least one node closer to the location of the vehicle and utilizing the at least one virtual machine to provide the service to the at least one vehicle.

11. The non-transitory computer-readable medium of claim 10, wherein the service supports a collision avoidance system utilized by the at least one vehicle.

12. The non-transitory computer-readable medium of claim 10, wherein the latency exceeding the predetermined threshold is associated with a safety risk.

13. The non-transitory computer-readable medium of claim 10, wherein the instructions when executed by the processor are configured to:

position at least one hardware component in a vicinity of the location; and utilize the at least one hardware component to provide the service to the at least one vehicle.

14. The non-transitory computer-readable medium of claim 10, wherein the instructions when executed by the processor are configured to:

transmitting a notification to a third party if the latency exceeds a predetermined threshold.

15. A system, comprising:

means for identifying at least one vehicle operating on a boundary of a network;

means for determining at least one node on the network that is providing a cloud-based service hosted in the network to the at least one vehicle;

means for measuring a first parameter related to how long it takes the at least one node to respond to a communication from the vehicle;

means for measuring a second parameter related to an amount of time that it takes for the at least one node to perform one or more tasks related to the service;

means for calculating a first weighted value for the first parameter and a second weighted value for the second parameter;

means for utilizing the first weighted value and the second weighted value to determine latency between the at least one vehicle and the at least one node;

means for determining that latency, between the at least one vehicle and the at least one node through deployment of resources on the boundary of the network, exceeds a predetermined threshold;

identifying a location of the vehicle; and means for moving a service associated with the vehicle to at least one node closer to the location of the vehicle and having a latency with the at least one vehicle below the predetermined threshold by deploying at least one virtual machine providing the service to the at least one node closer to the location of the vehicle and utilizing the at least one virtual machine to provide the service to the at least one vehicle.

16. The system of claim 15, comprising:

means for transmitting a notification to a third party if the latency exceeds a predetermined threshold.

17. The system of claim 15, comprising:

means for positioning at least one hardware component in a vicinity of the location; and means for utilizing the at least one hardware component to provide the service to the at least one vehicle.

18. The system of claim 15, wherein the service comprises storing data.

19. The system of claim 15, wherein the service comprises processing data.

* * * * *